United States Patent
Henderson

(10) Patent No.: US 12,503,028 B2
(45) Date of Patent: Dec. 23, 2025

(54) MOBILE CROSS-DOCK WITH DROP FRAME TRAILER

(71) Applicant: FedEx Ground Package System, Inc., Moon Township, PA (US)

(72) Inventor: Travis Henderson, Pittsburgh, PA (US)

(73) Assignee: FedEx Ground Package System, Inc., Moon Township, PA (US)

( * ) Notice: Subject to any disclaimer, the term of this patent is extended or adjusted under 35 U.S.C. 154(b) by 0 days.

(21) Appl. No.: 18/626,559

(22) Filed: Apr. 4, 2024

(65) Prior Publication Data

US 2025/0313140 A1    Oct. 9, 2025

(51) Int. Cl.
*B60P 1/00* (2006.01)
*B60P 1/02* (2006.01)
*B60P 1/36* (2006.01)

(52) U.S. Cl.
CPC ............... *B60P 1/003* (2013.01); *B60P 1/027* (2013.01); *B60P 1/36* (2013.01)

(58) Field of Classification Search
CPC .... B65G 63/002; B65G 63/022; B65G 63/02; B65G 63/004; B65G 63/025; B65G 67/20; B65G 67/24; B65G 2201/0235; B60P 1/003; B60P 1/027; B60P 1/36
See application file for complete search history.

(56) References Cited

U.S. PATENT DOCUMENTS

| | | | | |
|---|---|---|---|---|
| 3,454,172 A | * | 7/1969 | Carr | B65G 67/00 414/343 |
| 3,688,926 A | * | 9/1972 | Stefanelli | B60P 1/365 198/606 |
| 5,915,913 A | * | 6/1999 | Greenlaw | B61D 47/00 414/679 |
| 6,179,535 B1 | * | 1/2001 | Bouchard | B60J 5/14 410/131 |
| 6,520,729 B1 | | 2/2003 | Gibson | |
| 7,114,905 B2 | * | 10/2006 | Dibdin | B60P 1/02 414/679 |

(Continued)

FOREIGN PATENT DOCUMENTS

| | | | | |
|---|---|---|---|---|
| EP | 4074625 A1 | 10/2022 | | |
| GB | 2175566 A | * 12/1986 | ............... | B60P 1/00 |
| WO | WO 2017/136385 A1 | 8/2017 | | |

OTHER PUBLICATIONS

Dockzilla, Mobile Cross Dock, Sep. 21, 2023, availble at https://dockzilla.com/products/modular-buildings/mobile-cross-dock/. (Year: 2023).*

(Continued)

*Primary Examiner* — Gregory W Adams
(74) *Attorney, Agent, or Firm* — Fish & Richardson P.C.

(57) ABSTRACT

A mobile cross-dock includes a drop-frame trailer including: a first deck having a first height above the ground; a second deck having a second height above the ground that is greater than the first height, the second deck being located in a front portion of the trailer above a coupler assembly; side doors arranged on at least one longitudinal side wall of the drop-frame trailer; a back door on a back-end of the drop-frame trailer; a nose door on a front-wall of the drop-frame trailer; and a conveyor mounted longitudinally within the drop-frame trailer and extending from the back door towards the nose door.

19 Claims, 8 Drawing Sheets

(56) References Cited

U.S. PATENT DOCUMENTS

| | | | |
|---|---|---|---|
| 8,702,366 B2* | 4/2014 | Campbell | B65G 67/04 |
| | | | 414/343 |
| 9,457,970 B1 | 10/2016 | Zevenbergen et al. | |
| 9,567,168 B1 | 2/2017 | Tibbens et al. | |
| 9,688,489 B1* | 6/2017 | Zevenbergen | B25J 11/00 |
| 9,702,175 B2* | 7/2017 | Jaworski | E05D 5/0207 |
| 9,884,734 B1 | 2/2018 | Garner | |
| 10,137,816 B2 | 11/2018 | Harper et al. | |
| 10,350,643 B2 | 7/2019 | Veasey | |
| 10,434,923 B2* | 10/2019 | Baker | B65G 21/00 |
| 11,161,703 B2 | 11/2021 | Garner | |
| 12,043,160 B2* | 7/2024 | Cruz | B65G 69/008 |
| 2009/0169349 A1* | 7/2009 | Reed | B65G 67/08 |
| | | | 414/809 |
| 2018/0111164 A1 | 4/2018 | Veasey | |
| 2019/0061593 A1* | 2/2019 | Harper | G06Q 10/0833 |
| 2022/0169166 A1* | 6/2022 | Payson | B60P 7/0815 |

OTHER PUBLICATIONS

International Search Report and Written Opinion in International Appln. No. PCT/US2025/022934, mailed on Jul. 2, 2025, 13 pages.

* cited by examiner

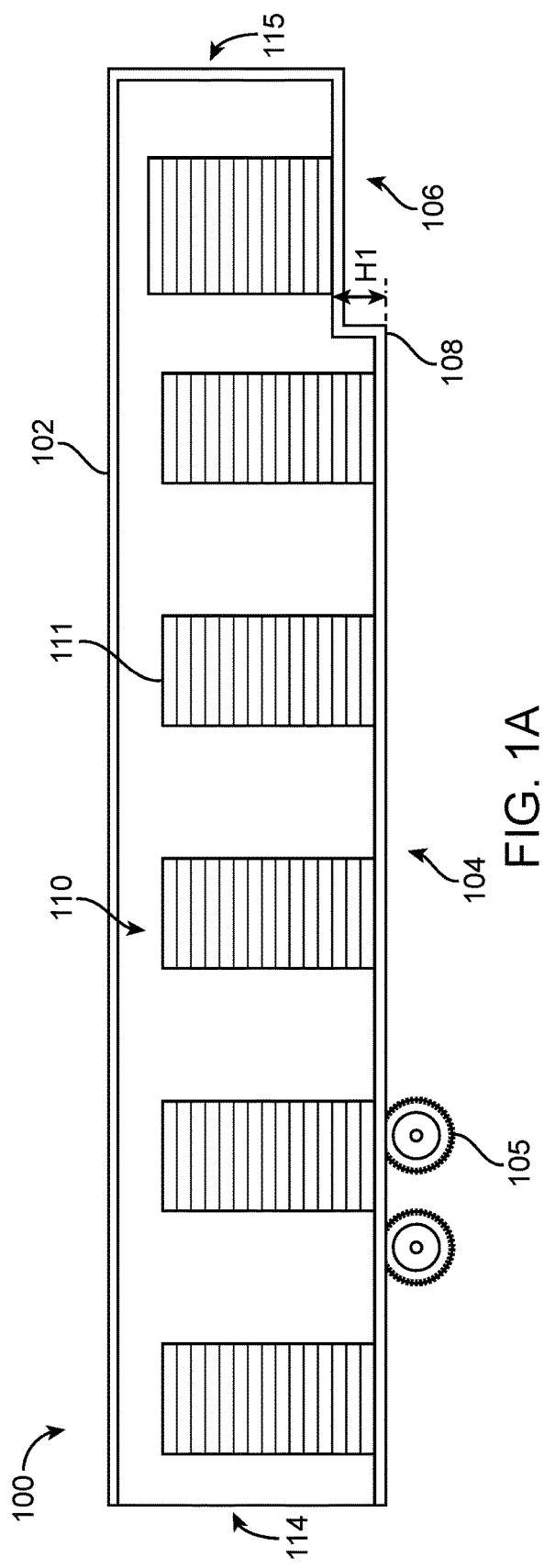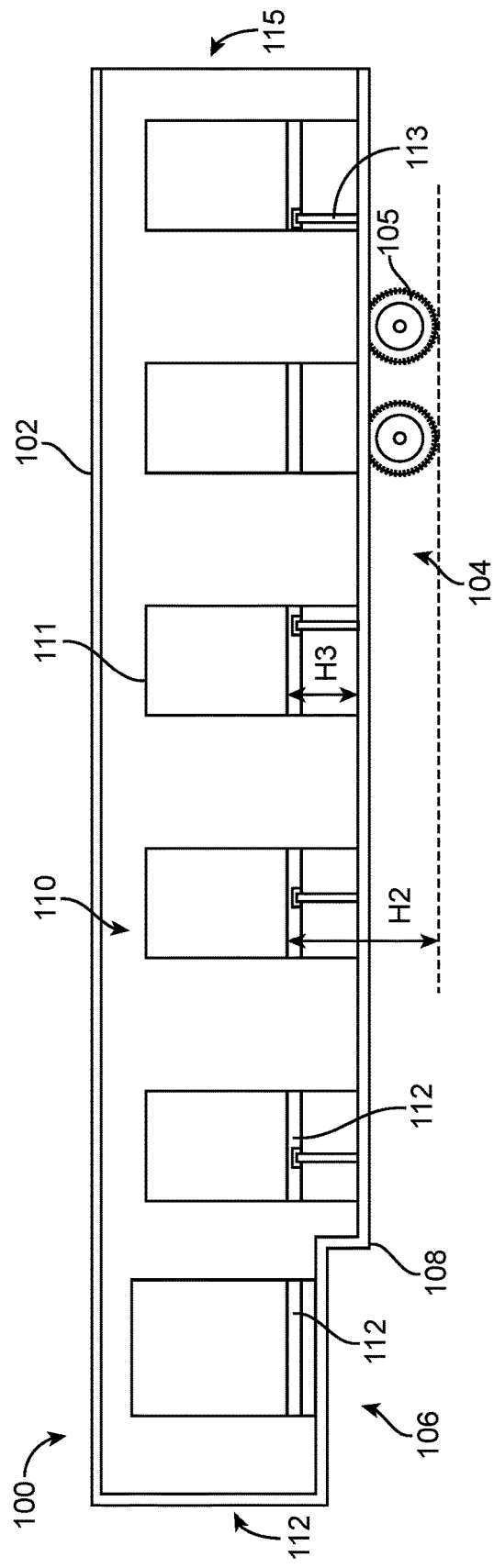

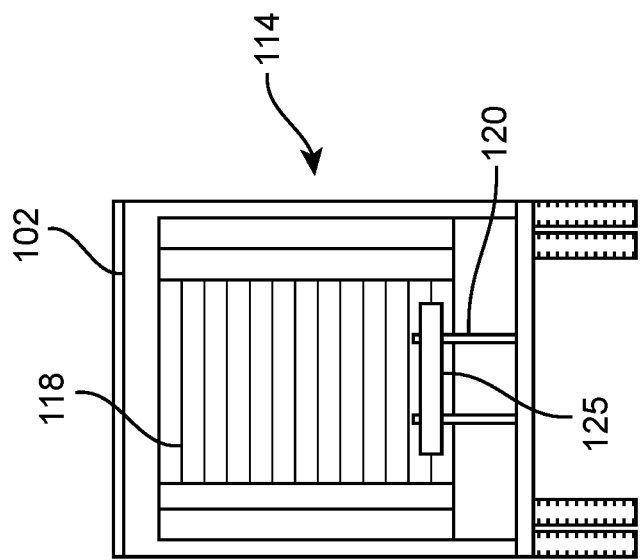
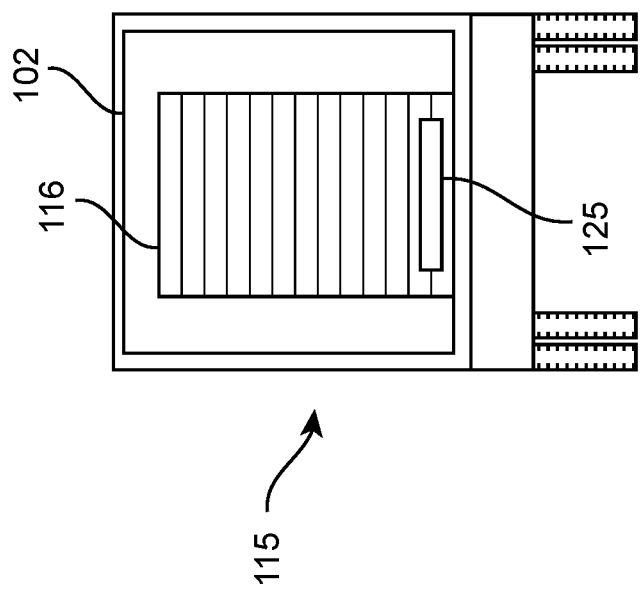
FIG. 2A
FIG. 2B

MOBILE CROSS-DOCK WITH DROP FRAME TRAILER

BACKGROUND

Cross docks are used by distribution centers to transfer goods between modes of transportation. Goods arriving from a point of origin are transferred to a vehicle (e.g., a truck) traveling to the destination or another intermediate cross-dock where the goods will be transferred to a delivery vehicle. The use of cross-docks in logistical operations reduces transit time in shipping networks, e.g., by minimizing or eliminating temporary storage of the goods while in transit. Cross-docking can be improved through the use of mobile cross-docking facilities, in particular during times of increased shipping demand.

SUMMARY

The present disclosure relates to mobile cross-dock including a drop-frame trailer, which can be used in mobile package delivery loading docks. Mobile package delivery loading docks carry objects, e.g., packages, to a location where the objects will be transferred to another vehicle, e.g., a delivery truck. The mobile cross-dock can also be used to expand the capabilities of a building loading dock. For example, the mobile cross-dock can be positioned at a load door, e.g., to receive goods from a sorting center and/or material handling system, and distributed those goods to multiple delivery trucks. Generally, the floor of a mobile package delivery loading dock is higher than the height of the floor of the other vehicle. This difference in height can lead to obstacles in transferring the objects, e.g., require additional infrastructure or human intervention so that the objects do not fall during the transfer.

The present disclosure describes a mobile package delivery loading dock with a drop-frame trailer, e.g., the floor of the mobile package delivery dock has two heights, where the lower height is selected to be the same as the height of a vehicle receiving the objects. As a result, transferring the objects from the mobile package delivery dock to the other vehicle can be streamlined.

The mobile package delivery loading dock includes a conveyor that conveys an object through the interior of the mobile package delivery loading dock. The conveyor can be programmed to deliver specific objects to specific doors of the mobile package delivery loading dock or to exit one mobile package delivery loading dock and enter another mobile package delivery loading dock through a nose door. Once the object has been delivered to the appropriate door, the objects can be transferred from the mobile package delivery loading dock to an appropriate vehicle.

In general, one innovative aspect can be embodied in a mobile cross-dock including a drop-frame trailer including: a first deck having a first height above the ground; a second deck having a second height above the ground that is greater than the first height, the second deck being located in a front portion of the trailer above a coupler assembly; side doors arranged on at least one longitudinal side wall of the drop-frame trailer; a back door on a back-end of the drop-frame trailer; a nose door on a front-wall of the drop-frame trailer; and a conveyor mounted longitudinally within the drop-frame trailer and extending from the back door towards the nose door.

Another innovative aspect can be embodied in a mobile cross-dock including a drop-frame trailer including: a first deck having a first height above the ground; a deck having a second height above the ground that is greater than the first height, the second deck being located in a front portion of the trailer above a coupler assembly; side doors arranged on at least one longitudinal side wall of the drop-frame trailer at locations corresponding with the deck; a back door on a back-end of the drop-frame trailer; a nose door on a front-wall of the drop-frame trailer; and a conveyor mounted longitudinally within the drop-frame trailer and extending from the back door to the nose door, the conveyor configured to extend through the nose door and mate with another conveyor mounted to a second drop-frame trailer, such that multiple drop-frame trailers can be arranged end to end, thereby, forming an extended cross-dock system. The first height can be substantially the same as a transport vehicle floor height. The conveyor can be configured to convey packages from through the nose door to the second drop-frame trailer.

Another innovative aspect can be embodied in a mobile cross-dock system including a first drop-frame trailer and a second drop-frame trailer, each of the first and the second drop frame trailer including: a first deck having a first height above the ground; a deck having a second height above the ground that is greater than the first height, the second deck being located in a front portion of the trailer above a coupler assembly; side doors arranged on at least one longitudinal side wall of the drop-frame trailer at locations corresponding with the deck; a back door on a back-end of the drop-frame trailer; a nose door on a front-wall of the drop-frame trailer; and a conveyor mounted longitudinally within the drop-frame trailer and extending from the back door towards the nose door. The first drop-frame trailer can be positioned in front of the second drop-frame trailer such that the nose door of the second drop-frame trailer is adjacent the back door of the first drop-frame trailer. The conveyor of the second drop-frame trailer can extend through the nose door of the second drop-frame trailer and mate with the conveyor of the first drop-frame trailer, to form a continuous conveyor path between the first drop-frame trailer and the second drop-frame trailer.

The foregoing and other embodiments can each optionally include one or more of the following features, alone or in combination.

In some implementations, the side doors are any one of the group consisting of rollup doors, sliding doors, and pivoting doors.

In some implementations, the conveyor extends through the nose door and is configured to mate with another conveyor mounted to a second drop-frame trailer, such that multiple drop-frame trailers can be arranged end to end, thereby, forming an extended cross-dock system.

In some implementations, the conveyor is configured to convey packages from through the nose door to the second drop-frame trailer.

In some implementations, the conveyor is configured to convey packages through the nose door to a vehicle of a different mode-of-transportation.

In some implementations, the first height is substantially the same as a transport vehicle floor height.

In some implementations, the first height is about 34.5 inches.

In some implementations, the second height is about 27 inches.

In some implementations, the conveyor extends 26" to 38" above the first deck.

In some implementations, the conveyor is mounted on a floor of the second deck.

In some implementations, an interior, bottom portion of the nose door is recessed by at least a thickness of the conveyor.

In some implementations, a difference between the first and second height is about 7.5 inches.

In some implementations, the coupler assembly includes a kingpin attached to a bottom surface of the second deck at a position in a range of 30" to 36" from the nose door of the mobile cross-dock and centered relative to the side walls.

In some implementations, the coupler assembly includes a landing gear attached to a corner with the first and second decks meet.

In some implementations, the conveyer extends into the mobile cross-dock from an external location, and an external support that is external to the mobile cross-dock supports the conveyer.

In some implementations, the conveyor extends form the back door to the nose door.

The subject matter described in this specification can be implemented in various embodiments and may result in one or more of the following advantages.

In some implementations, using the disclosed cross-dock can allow for efficient loading of package delivery vehicles. For example, because the height of the deck where most of the unloading occurs is similar to the height of the transport vehicle, less work is required to transfer a package from an internal conveyor of the mobile cross-dock to a transport vehicle. Additionally, additional accessories, such as ramps, are not required to change the height of the package as the package transfers from the mobile cross-dock to a transport vehicle.

As another example, because the mobile cross-dock can form an extended cross-dock system, packages can be conveyed over long distances without interruption. Additionally, a package can move from one mobile cross-dock to another to arrive at a specified location, e.g., in front of a particular door that opens to a target vehicle.

In some implementations, the mobile package delivery loading dock can be retrofitted from preexisting trailers, e.g., 28', 33' or 53' trailers, reducing the cost of creating the loading dock.

In some implementations, the mobile cross-dock is registered and compliant with standards for highway operation. As a result, the mobile cross-dock can operate without need for additional permitting, e.g., provide similar transport readiness compared to semi-, recreational, or utility trailers.

In some implementations, the mobile cross-dock functions as an extension of an existing building, e.g., provides additional points of transport vehicle loading. For example, the mobile cross-dock can be parked at a dock-door, thereby establishing a system where objects can be conveyed to multiple transport vehicles through a single building exit and/or entry node.

In some implementations, the mobile cross-dock conveyance system is geometrically compatible with an upstream conveyance system, allowing uninterrupted movement of objects into the cross-dock for transport vehicle loading. For example, loading-dock chutes or rollers can transfer objects into the mobile cross-dock with uninterrupted flow.

In some implementations, the mobile cross-dock conveyance system is geometrically compatible with a downstream conveyance system, allowing uninterrupted movement of objects to additional areas. This downstream conveyance system can be additional mobile-cross docks, forming a scalar linear array of adjoined cross-docks that can increase the number of locations where objects are transferred to other transport-modes.

In some implementations, the mobile cross-dock includes additional safety or functional features. For example, interior lighting can improve object/workspace visibility, and hardware installed at cross-dock doors can receive aluminum dock-plates for improved egress/ingress safety.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A, 1B, and 1C depict side views of an example of a mobile cross-dock.

FIGS. 2A and 2B respectively depict rear and front views of the mobile cross-dock of FIGS. 1A and 1B.

Like reference numbers and designations in the various drawings indicate like elements.

DETAILED DESCRIPTION

Figure 1C:
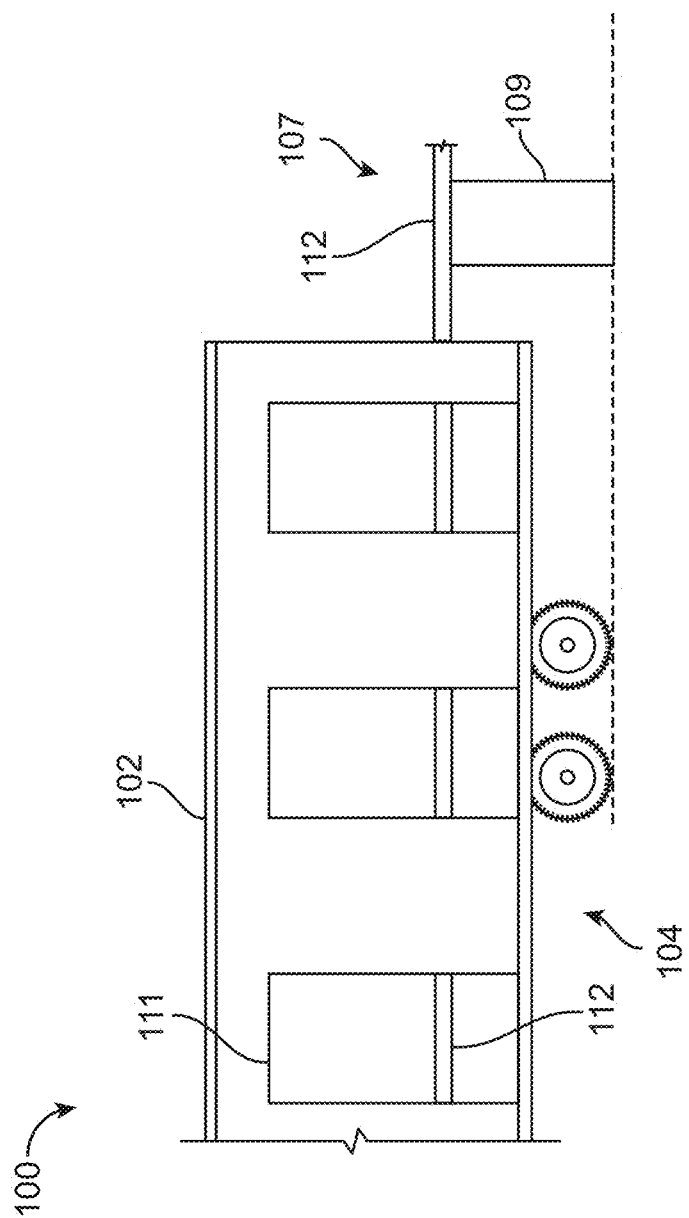

Cross-docking refers to methods for efficiently distributing products without needing to store the products in warehouses for long periods of time. For example, a cross-dock receives incoming objects, the objects are sorted at the cross-dock, and then the objects are loaded directly onto outgoing vehicles. A mobile cross-dock is a cross-docking facility that can move, e.g., has wheels and can be attached to a vehicle for transport.

With reference to FIGS. 1A and 1B, a mobile cross-dock 100 includes a trailer 102 having a first deck 104 and a second deck 106 and wheels 105, which make the cross-dock 100 mobile. Trailer 102 is a drop frame trailer, e.g., the height of the trailer drops from the second deck 106 to first deck 104.

The first deck 104 and second deck 106 are separated by a height H1, e.g., a distance as measured along a vertical direction parallel to the double-ended arrow in FIG. 1A. For example, the first deck 104 can have a first height above the ground, e.g., a road under the trailer 102, that is a typical height for a transport vehicle floor, e.g., 27 inches, and the second deck 106 can have a second height that is higher. In some implementations, the second height is a height that is typical for a loading dock, e.g., 48 inches. The difference between the first and second height is the height H1, e.g., 7.5 inches. The first deck 104 and second deck 106 meet at a corner 108, where a coupling assembly can attach (as will be explained with more detail with reference to FIGS. 4A and 4B).

The trailer 102 includes multiple side doors 111 arranged on the sidewalls 110, e.g., walls that extend in the longitudinal direction, of the trailer 102. In some implementations, there are three to seven side doors 111. FIG. 1A depicts the sidewall 110 with the side doors 111 in a closed position, and FIG. 1B shows a second sidewall 110 (opposite the first sidewall) with the side doors 111 in an open position.

In some implementations, the side doors 111, e.g., the side doors 111 above the first deck 104 can be opened manually, e.g., are roll-up doors, sliding doors, or pivoting doors. In some implementations, the side doors 111 above the second deck 106 are hinged, e.g., swinging, doors. Portions of the sidewalls 110 above both the first deck 104 and second deck 106 include side doors 111. In some implementations, the side doors 111 are about 4 feet wide and 7 feet tall. In this specification, an element having a dimension of "about" some value means the dimension element is in a range of 1% to 10%, e.g., 1%, 5%, or 10%, of the value. In some implementations, the spacing between side doors 111 can be selected to accommodate transport vehicles parking next to each other while being loaded, e.g., the spacing between the side doors 111 in the longitudinal direction can be about the width of a transport vehicle (9 to 12 feet).

The trailer 102 includes a conveyor 112, e.g., a roller bed conveyor belt, extending from a front-wall 115 of the trailer 102 to a back-end 114 of the trailer 102. The conveyor 112 extends longitudinally, e.g., parallel to the longitudinal sidewalls 110, at a fixed height from the ground, e.g., the height H2 between the ground marked by a dashed line in FIG. 1B of the conveyor 112 is substantially constant. Consequently, the height of the conveyor 112 relative to the first deck 104 and second deck 106 is different.

In general, the height H3 of the conveyor 112 above the first deck 104 is generally greater than the height of the conveyor 112 above the second deck 106. For example, the height H3 can be selected to be a convenient height, e.g., 26" to 38", for a human or a robotic device (such as robotic device 127 visible in FIG. 4B) within the trailer 102 picking up objects off of the conveyor 112. In some implementations, supports 113 attached to the first deck 104 support the conveyor 112 above the first deck 104. In some implementations, the second deck 106 supports the conveyor 112, e.g., the conveyer 112 is embedded within a floor 119 (visible in FIG. 4B) of the second deck 106.

In some implementations, the conveyer 112 is unpowered, e.g., not electrically powered, and the force of gravity causes the conveyer belt to translate through space. In some implementations, the conveyer is both manually and automatically, e.g., programmed, powered.

In some implementations, the conveyer 112 is not rigidly mounted to the first deck 104 or the second deck 106. Rather, the conveyer 112 extends from an external location 107, e.g., a building, into the mobile cross-dock 100 and is supported by an external support 109, e.g., a support structure in the building as shown in FIG. 1C. For example, the conveyer 112 can be provided at a "time-of-use," e.g., when the mobile cross-dock 100 is operating, by extending into the mobile cross-dock from either the rear door 118 or nose door 116.

With reference to FIG. 2A, the front-wall 115 of the trailer 102 includes a nose door 116. With reference to FIG. 2B, the back-end 114 of the trailer 102 includes a rear door 118. In some implementations, the back-end 114 of the trailer 102 includes handles 120. In some implementations, the nose door 116 has a width of about 4 feet and a height of about 8 feet. In some implementations, the rear door 118 includes both a swing door and a rollup door, where the rollup door is visible when the swing door is swung open.

In some implementations, either the nose door 116, the rear door 118, or both have a recess 125 on an edge of the nose doors 116 and rear doors 118 proximate to the corresponding deck. The recess 125 can be sized and accommodated to allow the conveyor 112 to extend through the respective door. For example, if the conveyor is 18 inches wide and 30 inches tall, e.g., has a certain thickness, the recess 125 can be 20 inches wide and 32 inches tall. In other words, the nose door 116 can be recessed by about 2 inches.

Figure 2C:
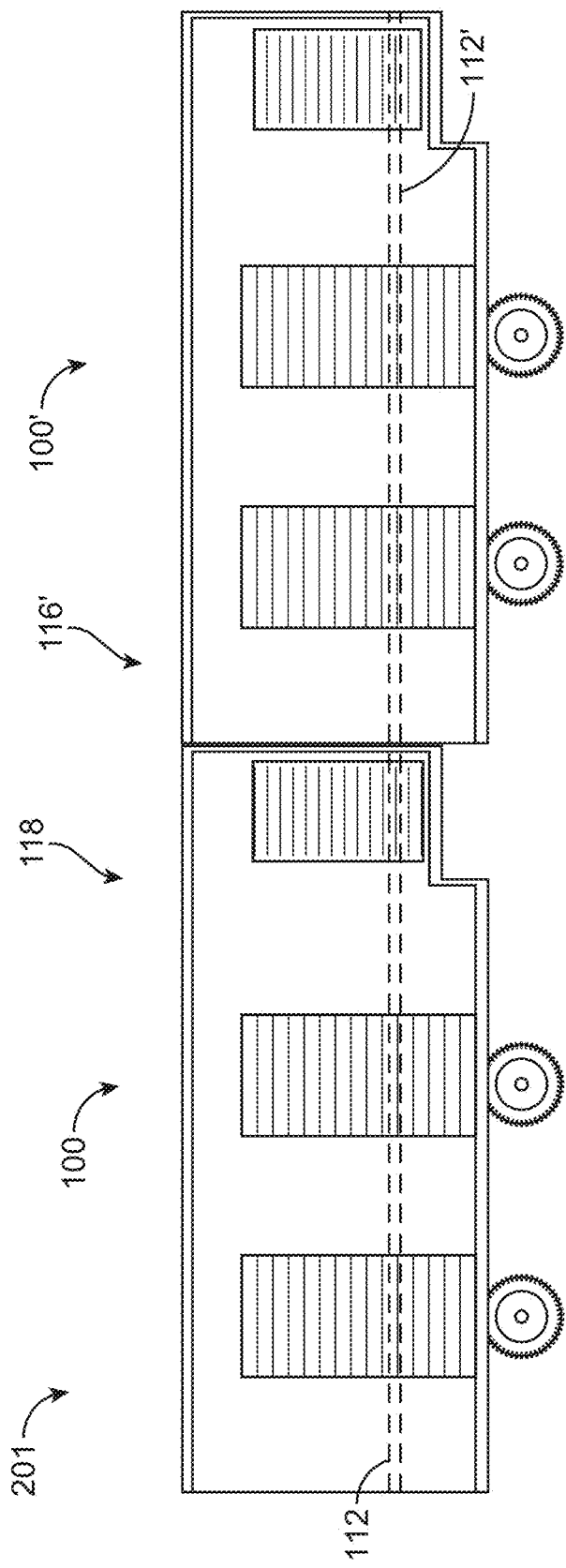
FIG. 2C depicts an extended cross-dock system including the mobile cross-docks of FIGS. 1A and 1B.

With reference to FIG. 2C, during operation of two mobile cross-docks 100 and 100', an object on one conveyor 112 can pass through the rear door 118 of a first mobile cross-dock and through a nose door 116' on another conveyor 112' of a second mobile cross-dock. Accordingly, the mobile cross-dock 100 can allow objects to pass to an adjacent mobile cross-dock. Multiple mobile cross decks can be configured such that the height of the conveyors 112 are substantially the same, allowing for a smooth transition from one conveyor to another. In other words, the two mobile cross-docks 100 are configured to mate with each other and form an extended cross-dock system 201.

As another example, the one conveyor 112 can convey packages through the nose door 116 through another nose door of a different type of vehicle, e.g., a different mode of transportation. For example, the other vehicle can be a box-truck.

Figure 3A:
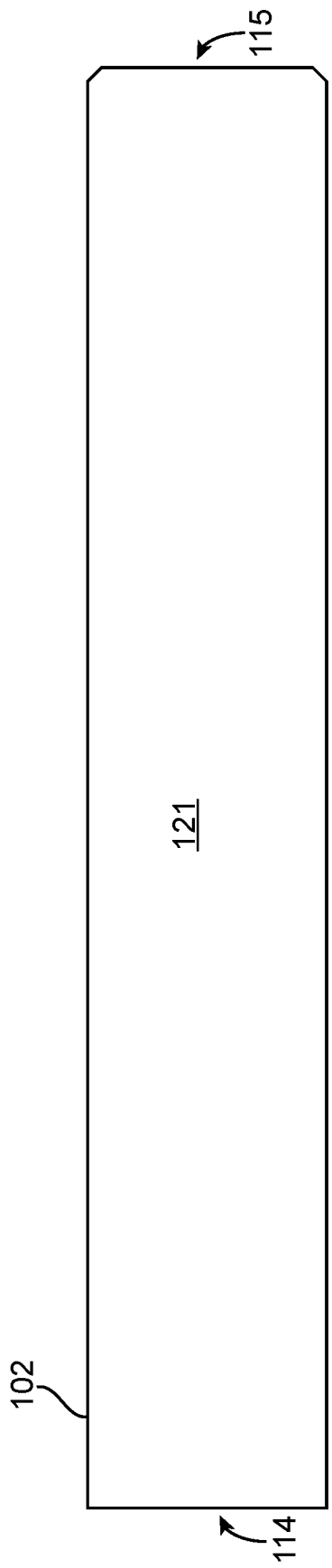
FIGS. 3A and 3B respectively depict top and bottom views of the mobile cross-dock of FIGS. 1A and 1B.
Figure 3B:
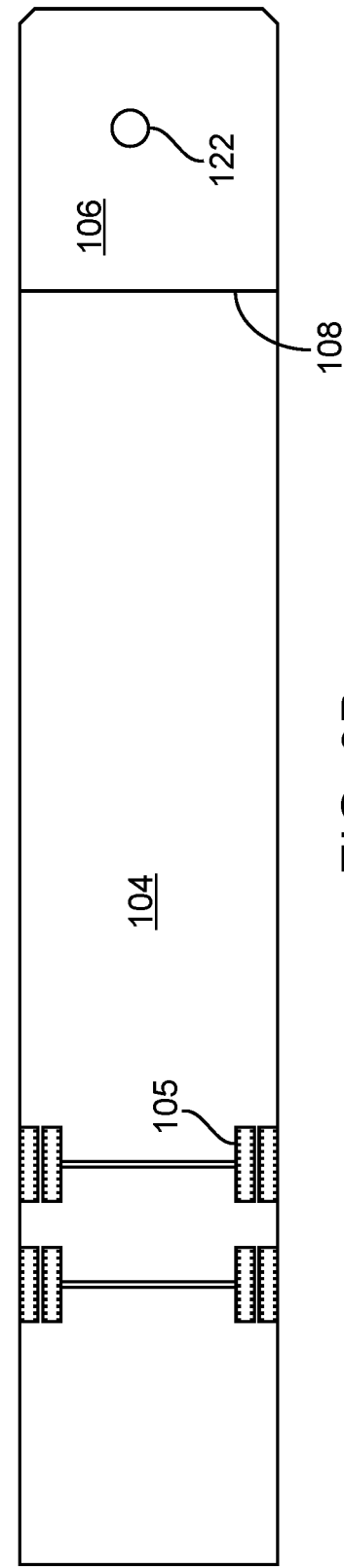

With reference to FIG. 3A, a top surface 121 of the trailer 102 can be substantially rectangular. In some implementations, the corners on the front-wall 115 are rounded, and the corners on the back-end 114 are sharp. With reference to FIG. 3B, the bottom surface of the trailer 102 includes the first deck 104 and second deck 106. From the perspective of FIG. 3B, the corner 108 where the first deck 104 and second deck 106 meet separates the two decks.

In some implementations, the mobile cross-dock 100 includes a coupling assembly 122, such as a kingpin on a lower surface of the second deck 106. The kingpin can be located a distance D, e.g., 30" to 36", from the nose door and be centered between the sidewalls 110. The kingpin can be configured to couple to another vehicle or a component connected to another vehicle. Wheels 105 that at least partially support the weight of the trailer 102 are also visible from the perspective of FIG. 3B. In some implementations, the height of the wheels 105 is between the first and second heights of the first deck 104 and second deck 106, respectively. For example, the wheel 105 can have a height of 25 inches.

Figure 4A:
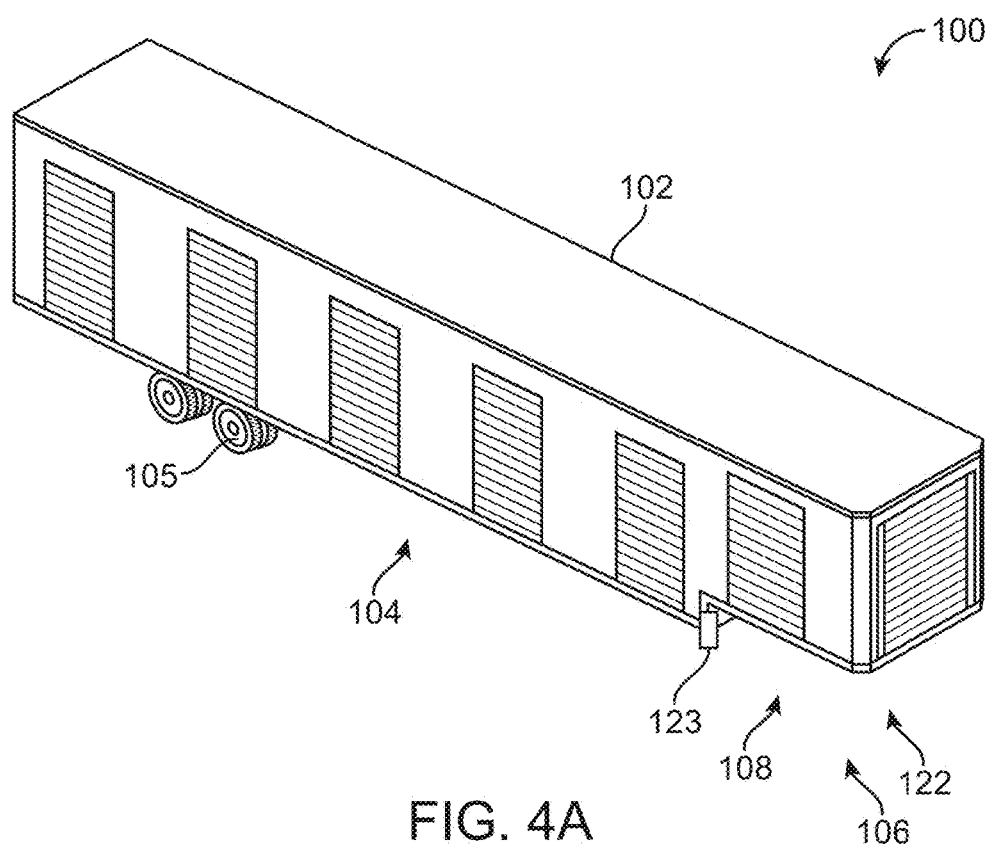
FIGS. 4A and 4B depicts two perspective views of the mobile cross-dock of FIGS. 1A and 1B.
Figure 4B:
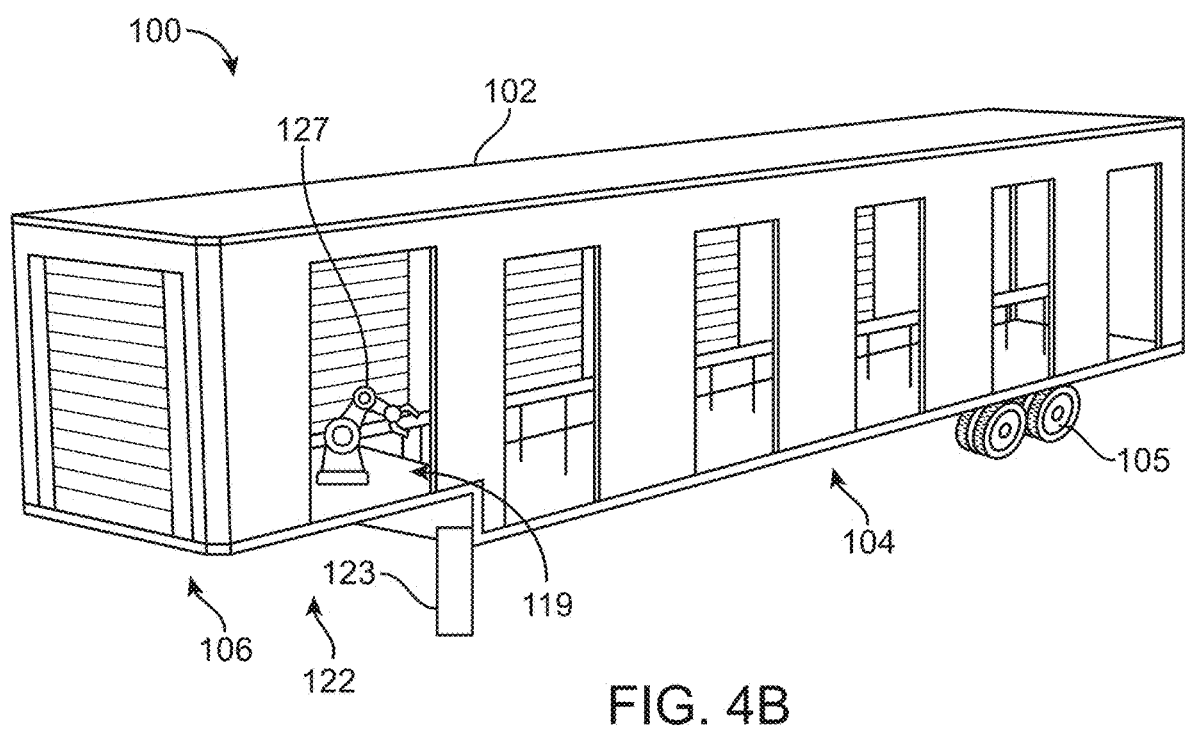

FIGS. 4A and 4B depict perspective views of the mobile cross-dock 100. The trailer 102 includes a coupling assembly 122 at the corner 108 where the first deck 104 and second deck 106 meet. In this example, the coupling assembly 122 includes a landing gear 123, which can unfold/fold to either be parallel to the first deck 104 or perpendicular to the first deck 104 to support the trailer 102. Together, the coupling assembly 122 and the wheels 105 can support the weight of the trailer 102 to maintain a stable configuration and level conveyor 112. When the coupling assembly 112 includes both a landing gear and a kingpin, the locations of the landing gear and kingpin differ.

The dimensions of the mobile cross-dock 100 can vary. For example, the trailer 102 can have a length between 20 feet and 60 feet, e.g., 28', 33' or 53.' The trailer 102 can have a height in a range of 10 to 13.5 feet. In some implementations, the length of the trailer 102 can vary from 7 feet to 11 feet. The trailer 102 can have a width, e.g., the distance from one sidewall 110 to another sidewall 110, in a range of 5 to 8.5 feet.

Figure 5A:
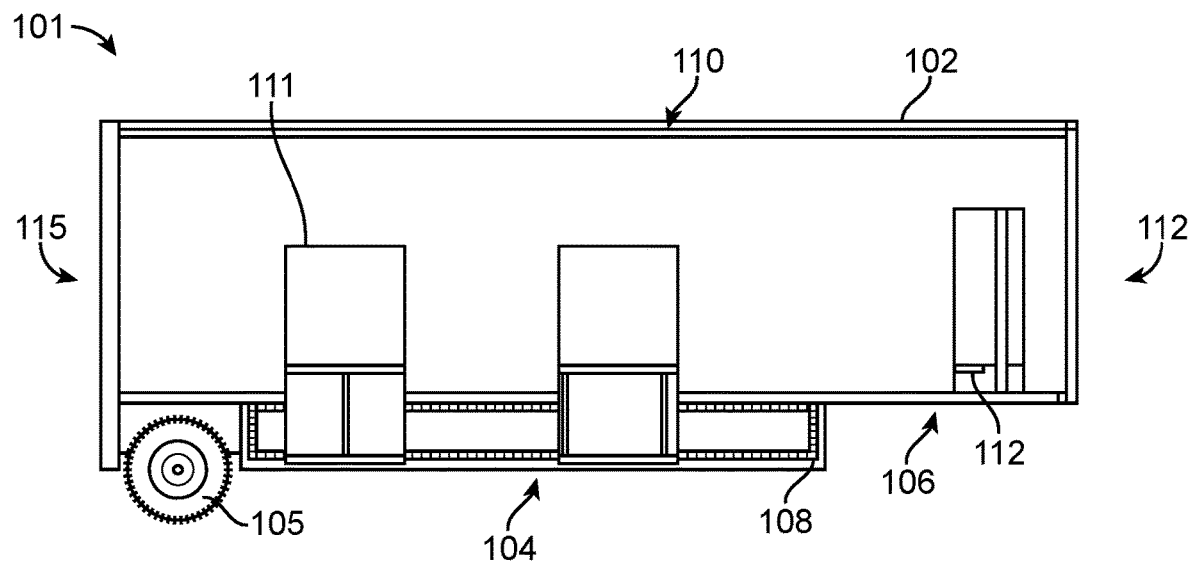
FIGS. 5A and 5B depict side views of another example of a mobile cross-dock.
Figure 5B:
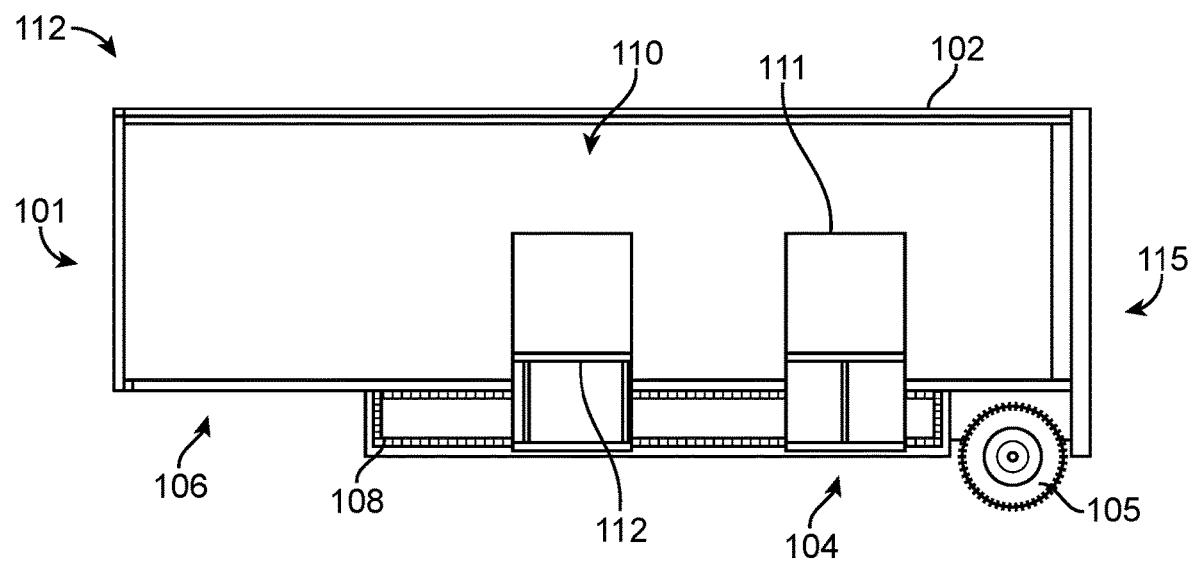

As an example, FIGS. 5A and 5B depict side views of a mobile cross-dock 101 having different dimensions compared to mobile cross-dock 100. For example, the longitudinal length of the trailer 102 of mobile cross-dock 101 is less than the longitudinal length of the trailer 102 of the mobile cross-dock 100.

In this example, there are only side doors 111 in the sidewalls 110 above the first deck, e.g., the lower deck, on one side of the trailer 102, e.g., the side visible in FIG. 5B. In some implementations, the conveyor 112 extends longitudinally and only partially through the trailer 102. For example, the conveyor 112 can end before reaching the back-end 114 of the trailer 102. In some implementations, there is a nonzero height of the conveyor 112 above the second deck 106, e.g., less than a foot.

Figure 6:
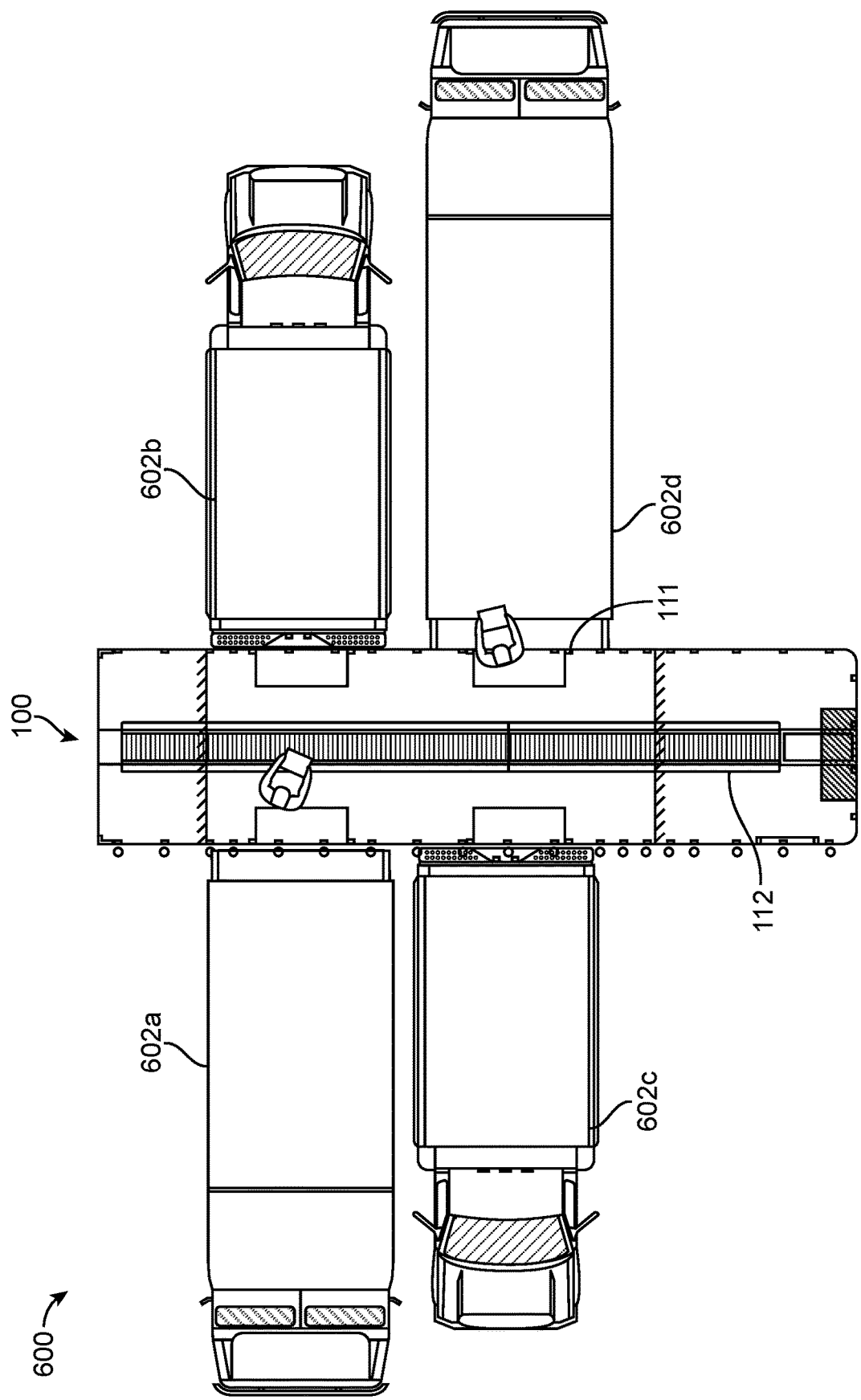
FIG. 6 depicts a package loading system 600 that includes the mobile cross-dock of FIGS. 1A and 1B.

During operation, the mobile cross-dock 100 can supply multiple vehicles with packages. For example, FIG. 6 depicts a package loading system 600 including the mobile cross-dock 100 and multiple vehicles 602a, 602b, 602c, and 602d. The rear end of the vehicle 602a-602d can be disposed proximate to the side doors 111, minimizing a distance between the conveyor 112 and the rear of the vehicle 602 used for loading packages. Due to the first deck 104 having a height similar to the height of the floors of the vehicle 602a-602d, additional apparatuses, such as ramps, can be avoided while loading packages from the mobile cross-dock 100 to the vehicle 602a-602d. Due to the spacing of the side doors being 111 being similar to the width of the vehicles 602, the vehicles 602 can be efficiently packed in space while loading, as well. The internal conveyer 112 can be programmed to deliver a package to in front of an appropriate side door 111, thereby minimizing a distance between a package and the side door 111 where the package will exit the mobile cross-dock 100. When the conveyer is not electrically programmed, the internal conveyer 112 can include components that are configured to be adjusted and/or controlled by humans.

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A mobile cross-dock comprising:
a drop-frame trailer comprising:
  a first deck having a first height above the ground;
  a second deck having a second height above the ground that is greater than the first height, the second deck being located in a front portion of the trailer above a coupler assembly;
  a plurality of side doors arranged on at least one longitudinal side wall of the drop-frame trailer;
  a back door on a back-end of the drop-frame trailer;
  a nose door on a front-wall of the drop-frame trailer; and
  a conveyor mounted longitudinally within the drop-frame trailer and extending from the back door towards the nose door,
wherein an interior, bottom portion of the nose door is recessed by at least a thickness of the conveyor.

2. The mobile cross-dock of claim 1, wherein the side doors are any one of the group consisting of rollup doors, sliding doors, and pivoting doors.

3. The mobile cross-dock of claim 1, wherein the conveyor extends through the nose door and is configured to mate with another conveyor mounted to a second drop-frame trailer, such that multiple drop-frame trailers can be arranged end to end, thereby, forming an extended cross-dock system.

4. The mobile cross-dock of claim 3, wherein the conveyor is configured to convey packages from through the nose door to the second drop-frame trailer.

5. The mobile cross-dock of claim 3, wherein the conveyor is configured to convey packages through the nose door to a vehicle of a different mode-of-transportation.

6. The mobile cross-dock of claim 1, wherein the first height is substantially the same as a transport vehicle floor height.

7. The mobile cross-dock of claim 5, wherein the first height is about 34.5 inches.

8. The mobile cross-dock of claim 1, wherein the second height is about 27 inches.

9. The mobile cross-dock of claim 1, wherein the conveyor extends 26" to 38" above the first deck.

10. The mobile cross-dock of claim 1, wherein the conveyor is mounted on a floor of the second deck.

11. The mobile cross-dock of claim 1, wherein a difference between the first and second height is about 7.5 inches.

12. The mobile cross-dock of claim 1, wherein the coupler assembly comprises a kingpin attached to a bottom surface of the second deck at a position in a range of 30" to 36" from the nose door of the mobile cross-dock and centered relative to the side walls.

13. The mobile cross-dock of claim 1, wherein the coupler assembly comprises a landing gear attached to a corner with the first and second decks meet.

14. The mobile cross-dock of claim 1, wherein the conveyer extends into the mobile cross-dock from an external location, and an external support that is external to the mobile cross-dock supports the conveyer.

15. The mobile cross-dock of claim 1, wherein the conveyor extends from the back door to the nose door.

16. A mobile cross-dock comprising:
a drop-frame trailer comprising:
  a first deck having a first height above the ground;
  a deck having a second height above the ground that is greater than the first height, the second deck being located in a front portion of the trailer above a coupler assembly;
  a plurality of side doors arranged on at least one longitudinal side wall of the drop-frame trailer at locations corresponding with the deck;
  a back door on a back-end of the drop-frame trailer;
  a nose door on a front-wall of the drop-frame trailer; and
  a conveyor mounted longitudinally within the drop-frame trailer and extending from the back door to the nose door, the conveyor configured to extend through the nose door and mate with another conveyor mounted to a second drop-frame trailer, such that multiple drop-frame trailers can be arranged end to end, thereby, forming an extended cross-dock system,
  wherein the first height is substantially the same as a transport vehicle floor height, and
  wherein the conveyor is configured to convey packages from through the nose door to the second drop-frame trailer.

17. The mobile cross-dock of claim 16, wherein the conveyor is mounted on a floor of the second deck.

18. The mobile cross-dock of claim 17, wherein the conveyor extends 26" to 38" above the first deck.

19. A mobile cross-dock system comprising:
a first drop-frame trailer and a second drop-frame trailer, each of the first and second drop frame trailers comprising:
   a first deck having a first height above the ground;
   a deck having a second height above the ground that is greater than the first height, the second deck being located in a front portion of the trailer above a coupler assembly;
   a plurality of side doors arranged on at least one longitudinal side wall of the drop-frame trailer at locations corresponding with the deck;
   a back door on a back-end of the drop-frame trailer;
   a nose door on a front-wall of the drop-frame trailer; and
   a conveyor mounted longitudinally within the drop-frame trailer and extending from the back door towards the nose door,
wherein the first drop-frame trailer is positioned in front of the second drop-frame trailer such that the nose door of the second drop-frame trailer is adjacent the back door of the first drop-frame trailer, and
wherein the conveyor of the second drop-frame trailer extends through the nose door of the second drop-frame trailer and mates with the conveyor of the first drop-frame trailer, to form a continuous conveyor path between the first drop-frame trailer and the second drop-frame trailer.

* * * * *